US009865073B2

(12) United States Patent
Wampler

(10) Patent No.: US 9,865,073 B2
(45) Date of Patent: Jan. 9, 2018

(54) COMPUTER ANIMATION OF ARTWORK USING FAST 2-DIMENSIONAL DEFORMATION SOLVING

(71) Applicant: Adobe Systems Incorporated, San Jose, CA (US)

(72) Inventor: Kevin Wampler, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 184 days.

(21) Appl. No.: 14/875,037

(22) Filed: Oct. 5, 2015

(65) Prior Publication Data

US 2017/0098326 A1 Apr. 6, 2017

(51) Int. Cl.
*G06T 13/00* (2011.01)
*G06T 13/80* (2011.01)
*G06T 3/00* (2006.01)

(52) U.S. Cl.
CPC ............ *G06T 13/80* (2013.01); *G06T 3/0006* (2013.01)

(58) Field of Classification Search
CPC ..................... G06T 13/00; G06T 13/20–13/80
See application file for complete search history.

(56) References Cited

U.S. PATENT DOCUMENTS

| 6,016,152 A * | 1/2000 | Dickie | G06T 3/0093 345/648 |
| 2017/0032055 A1* | 2/2017 | Eisemann | G06F 17/10 |
| 2017/0032579 A1* | 2/2017 | Eisemann | G06T 13/40 |

OTHER PUBLICATIONS

Jacobson et al., Bounded Biharmonic Weights for Real-Time Deformation, ACM Transactions on Graphics—Proceedings of ACM SIGGRAPH 2011, vol. 30, Issue 4, Article No. 78, Jul. 2011.*
Jacobson et al., Fast Automatic Skinning Transformations, vol. 31, Issue 4, Article No. 77, Jul. 2012.*
Yuille et al., The Concave-Convex Procedure (CCCP), Neural Computation, vol. 15, No. 4, Apr. 2003.*

* cited by examiner

*Primary Examiner* — Charles Tseng
(74) *Attorney, Agent, or Firm* — Kilpatrick Townsend & Stockton LLP

(57) ABSTRACT

Systems and methods disclosed improve the speed of animating artwork by determining the handle affine transformations used to animate 2 Dimensional (2D) artwork in a computationally simpler manner than prior techniques. The improved technique represents vertex coordinates (e.g., x1, y1) in 2D artwork as the real and complex portions of complex numbers. Doing so allows minimizing a closed form expression to find handle affine transformations that provide a deformation of the object with minimal stretching and squashing in local areas. Determining handle affine transformation parameters in this way is more efficient computationally than prior techniques because it combines the local and global steps into a single formula. Moreover, the formulation can be quickly evaluated with only additions, multiplications, and square roots without any need for conditional branches. Furthermore, the form of the function allows it to be solved with a simple optimization method.

17 Claims, 6 Drawing Sheets

COMPUTER ANIMATION OF ARTWORK USING FAST 2-DIMENSIONAL DEFORMATION SOLVING

TECHNICAL FIELD

This disclosure relates generally to computer-implemented methods and systems and more particularly relates to improving the efficiency and effectiveness of computing systems used to animate characters and other artwork.

BACKGROUND

Existing software applications allow users to animate electronic characters and other artwork by placing a few handles on the artwork and then moving these handles. The software then figures out how to smoothly deform the rest of the artwork based on the handle movements. In this way, a user is able to animate the artwork by controlling only a few simple parameters, i.e., moving the handles.

Deforming the artwork based on the movement of the handles is accomplished by associating the handles with the rest of the artwork using a mesh of triangles with vertices (on the artwork) that are weighted relative to the handles. For each handle, an affine transformation is determined. The affine transformation is a geometric transformation that maps variables (e.g., pixel intensity values located at positions (x1, y1) in an image) into new variables (e.g., (x2, y2) in an output image) by applying a linear combination of translation, rotation, scaling, and/or shearing operations. Transformations for the vertices of the mesh are determined based on the weighted blending of the handle affine transformations. The handle affine transformations are thus used to determine how the mesh changes.

One existing deformation approach determines handle affine transformations by using an "as rigid as possible" technique that attempts to ensure that every small piece of the mesh deforms in a way that is as rigid as possible, i.e., to avoid stretching and squashing as much as possible in small portions of the mesh. The technique does so by breaking the mesh up into rotation clusters (groups of vertices) that it attempts to keep as rigid as possible (with minimal stretching and squashing) in a local/global iterative process. The local step solves for an optimal rigid transformation for each rotation cluster using a singular value decomposition in each iteration. The global step solves a linear system of rotational, scaling and shearing parameters for each handle while holding the rotations for each cluster fixed. Although this alternating local/global deformation algorithm is formulated to be efficiently solvable, it can sometimes be too slow for smooth real-time deformations, particularly when implemented on mobile devices.

SUMMARY

Systems and methods are disclosed herein for using one or more computing devices to animate artwork. One embodiment provides animates artwork based on handle movement on the artwork. This embodiment involves generating a mesh based on the artwork, wherein the mesh comprises triangles with vertices on the artwork, wherein bounded biharmonic weights for handles represent significance of individual handles to individual vertices of the mesh. The embodiment further involves receiving a movement of a handle of the handles and, based on the movement, minimizing a closed-form expression to find handle affine transformations that provide a deformation of the artwork with minimal stretching, shearing, and skewing in local areas. The embodiment further involves animating the artwork by transforming the vertices of the mesh according to the determined handle affine transformations and the biharmonic weights.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
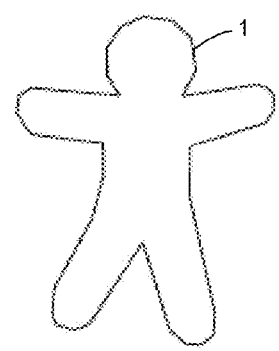
FIG. 1 illustrates an image of a gingerbread man figure that a user will animate.

As discussed above, one current technique of animating electronic characters and other artwork uses a deformation technique that can sometimes be too slow for smooth real-time deformations. This patent improves this prior technique to improve the speed of computing deformations by determining the handle affine transformations used to animate 2 Dimensional (2D) artwork in a computationally simpler manner. The technique represents vertex coordinates (e.g., x1, y1) in 2D artwork as the real and complex portions of complex numbers. Doing so allows minimizing a closed form expression to find handle affine transformations that provide a deformation of the object with minimal stretching and squashing in local areas. Determining handle affine transformation parameters in this way is more efficient computationally than prior techniques because it combines the local and global steps into a single formula. Moreover, the formulation can be quickly evaluated with only additions, multiplications, and square roots without any need for conditional branches. Furthermore, the form of the function allows it to be solved with a simple optimization method.

In one embodiment, animating artwork based on handle movement involves identifying rotation clusters by subdividing vertices of a mesh based on similarity of the bounded biharmonic weights of the vertices. The embodiment next minimizes an energy function that represents desirability of deformations of the rotation clusters (e.g., attempting to keep rotation clusters as rigid as possible). Specifically, the energy function represents the desirability of deformations of the rotation clusters with an algebraic formula for the optimal rotation aligning a pair of two-dimensional sets of points. More specifically, one set of points represents a rotation cluster transformed according to a deformation of the mesh and another set of points represents a simple rotation of the rotation cluster with no stretching, shearing, or skewing. The algebraic formula incorporates the optimal rotation aligning this pair of sets of points and combines the properties of the prior technique's local and global steps into a single formula. The function can then be minimized to find a solution of handle affine transformations that deforms the mesh with minimal stretching and skewing in small areas. Once the handle affine transformations are determined, transformations of the vertices are then identified based on how the handles are weighted for each of the vertices.

In the above example, the desirability of deformations of the rotation clusters is represented by an algebraic formula for the optimal rotation aligning a pair of two-dimensional sets of points. This can be a single algebraic formula representing the desirability of the deformations using only convex and concave functions, such as an algebraic formula representing the desirability of the deformations as a difference between a quadratic form and a sum of cones. When the desirability of deformations is represented in this way, a convex-concave procedure (CCCP) is used to efficiently solve for the handle affine transformations, providing additional computational efficiencies over prior techniques.

The techniques presented herein use algebraic manipulations to derive a simpler and more efficiently computable representation of the desirability of a deformation than was used in previous techniques. Moreover, representing the desirability of the deformations as described above and combining the prior technique's local and global determinations avoids the need to use singular value decomposition to solve each rotation cluster's rotation and avoids the inefficiency of the local/global iterative process. The result is a faster, more efficient animation of artwork that is better suited for use on mobile devices and other computing environments with limited processing resources.

As used herein, the phrase "artwork" refers to any electronic image, photograph, video frame, or other graphic displayed on a display of an electronic device. Artwork may depict an object such as a person, building, car, plane, ship, plant, or any other object.

As used herein, the phrase "handle" refers to an item positioned relative to artwork to control animation of the artwork. A user or automated process moves the handle to a new position and an animation is determined based on the movement of the handle from the initial position to the moved position. A handle can be a single point, a line segment, or a combination of points and line segments.

As used herein, the phrase "bounded biharmonic weight" refers to a weight used to produce a deformation by minimizing energy subject to bound constraints. An existing technique for determining bounded biharmonic weights is disclosed by Alec Jacobson, Ilya Baran, Ladislav Kavan, Jovan Popovic, and Olga Sorkine, "Fast automatic skinning transformations," ACM Transactions on Graphics (proceedings of ACM SIGGRAPH), 31(4):77:1-77:10, 2012, the disclosure of which is incorporated herein in its entirety by this reference. Additional or alternative techniques may be used to determine bounded biharmonic weights.

As used herein, the phrase "add resolution" refers to adding one or more vertices to a mesh.

As used herein the phrase "smooth deformation" refers to a deformation based on manipulating a mesh in a way that avoid any visible edges at the junction of triangles between handles.

As used herein the phrase "affine transformation" refers to a geometric transformation that maps variables (e.g., pixel intensity values located at positions (x1, y1) in an image) into new variables (e.g., (x2, y2) in an output image) by applying a linear combination of translation, rotation, scaling, and/or shearing operations.

As used herein the phrase "closed form expression" refers to a mathematical expression that can be evaluated in a finite number of operations. A closed form expression may contain constants, variables, certain "well-known" operations (e.g., + − × ÷), and functions (e.g., nth root, exponent, logarithm, trigonometric functions, and inverse hyperbolic functions).

As used herein the phrase "convex function" refers to a continuous function whose value at the midpoint of every interval in its domain does not exceed the arithmetic mean of its values at the ends of the interval.

As used herein the phrase "concave function" refers to a negative of a convex function.

As used herein the phrase "quadratic form" refers to a polynomial where the variables are the undetermined parameters in the transformations, wherein the polynomial has a maximum degree of two. In a quadratic form, the only elements appearing are constant numbers, constants multiples of variables, constant multiples of one variable times another variable, or constant multiples of one variable times itself.

As used herein the phrase "cone" refers to the square root of a quadratic form.

The techniques herein provide an easy way for a user to manipulate a 2D figure or other artwork in a manner somewhat similar to how one might manipulate a doll or a figure made of clay. To achieve this, the user first specifies a number of handles on the artwork. Each of these handles can be dragged around by the user, with the rest of the artwork deforming so that the result looks "natural" while ensuring that each handle goes where the user dragged it.

Figure 2:
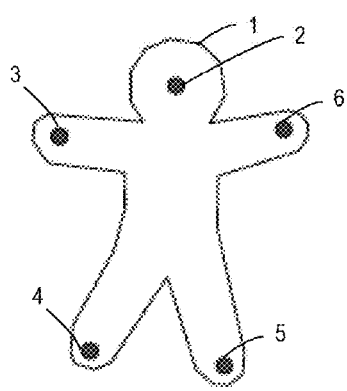
FIG. 2 illustrates the image of the gingerbread man of FIG. 1 with user positioned handles.

FIG. 1 illustrates an image of a simple gingerbread man 1 that a user will animate using a computerized animation feature. The user first specifies a few handles 2, 3, 4, 5, 6 on the gingerbread man 1, as illustrated in FIG. 2. When the user moves the handles to new locations, the rest of the gingerbread man 1 deforms along with the handles in a natural-looking way.

Figure 3:
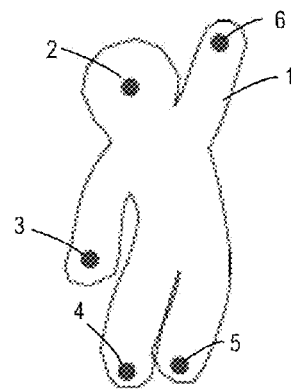
FIGS. 3-4 illustrate deformation of the gingerbread man of FIGS. 1-2 based on movements of the handles.
Figure 4:
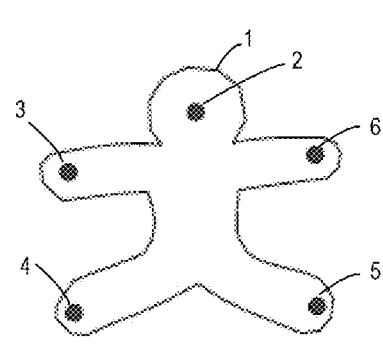
Figure 5:
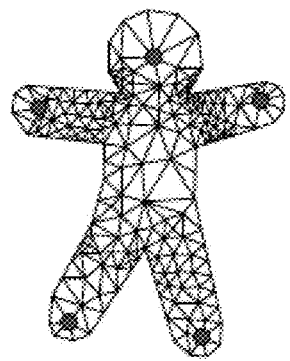
FIGS. 5-7 illustrate deformation of the mesh of triangles of the gingerbread man of FIGS. 1-2 based on movements of the handles.
Figure 6:
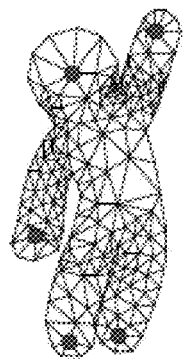
Figure 7:
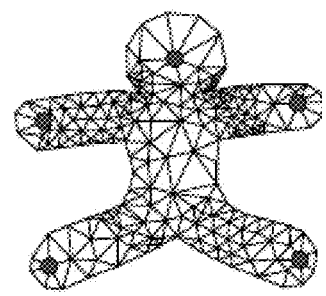

FIGS. 3-4 illustrate deformation of the gingerbread man 1 based on movements of the handles 2, 3, 4, 5, and 6. Internally, the computer system executes a program that determines how to deform the gingerbread man. In this example, an algorithm represents the shape of the gingerbread man with both its outline and a mesh. The outline is a polygonal path representing the outer boundary of the gingerbread man 1. In addition to this outline, a mesh is used to represent the interior of the gingerbread man 1. This mesh of vertices forming triangles is not only used to draw the interior of the gingerbread man, but is also used to calculate the deformation. In these examples, this deformation is formulated to keep each triangle's shape as close as possible to its shape in the original artwork, subject to the requirement that the position of the handles must match the user's specification. FIGS. 5-7 illustrate deformation of the mesh of vertices forming triangles of the gingerbread man 1 based on movements of the handles 2, 3, 4, 5, and 6.

As discussed above, one current technique of animating electronic characters and other artwork deforms a very-fine mesh with many vertices and relatively small triangles throughout the mesh. This patent provides techniques to improve the quality and speed of computing deformations used to animate artwork by using adaptive meshing. The prior technique used an algorithm that starts with artwork described as a mesh of vertices forming triangles. This mesh is often generated by triangulating based on the desired outline of the artwork, and is held fixed throughout the entire algorithm. The user then places a set of handles on the artwork, each of which is located at a single vertex of the preexisting mesh. Then a bounded biharmonic weights approach is used to solve for a set of weights determining how closely each mesh vertex's position is tied to each handle. Vertices close to one handle but far from other handles will have their positions primarily determined by the nearby handle, whereas vertices in between multiple handles will have their positions determined by blending between multiple different handles.

One drawback of this approach is that the original mesh must often contain many vertices in order to give smooth-looking results. If the initial mesh is too coarse, then the user can easily place two handles close to each other where there are not enough triangles in between the two handles. This results in a visible "edge" at the junctions of triangles between these two handles, rather than a smooth blend like the user probably wanted. To avoid this a very fine mesh is necessary, which makes the bounded biharmonic weights much more computationally expensive to solve for.

Unlike this prior approach, one embodiment disclosed herein does not fix the mesh in advance, but instead creates the mesh only after the handles have been placed, simultaneously with solving for the bounded biharmonic weights. This is substantially more efficient for at least two reasons. First, the mesh contains many fewer vertices and triangles overall by adding resolution only where it is needed. Second, the bounded biharmonic weights are solved in a course-to-fine manner, using the solution at coarse resolutions to speed up the solutions at fine levels.

Figure 8:
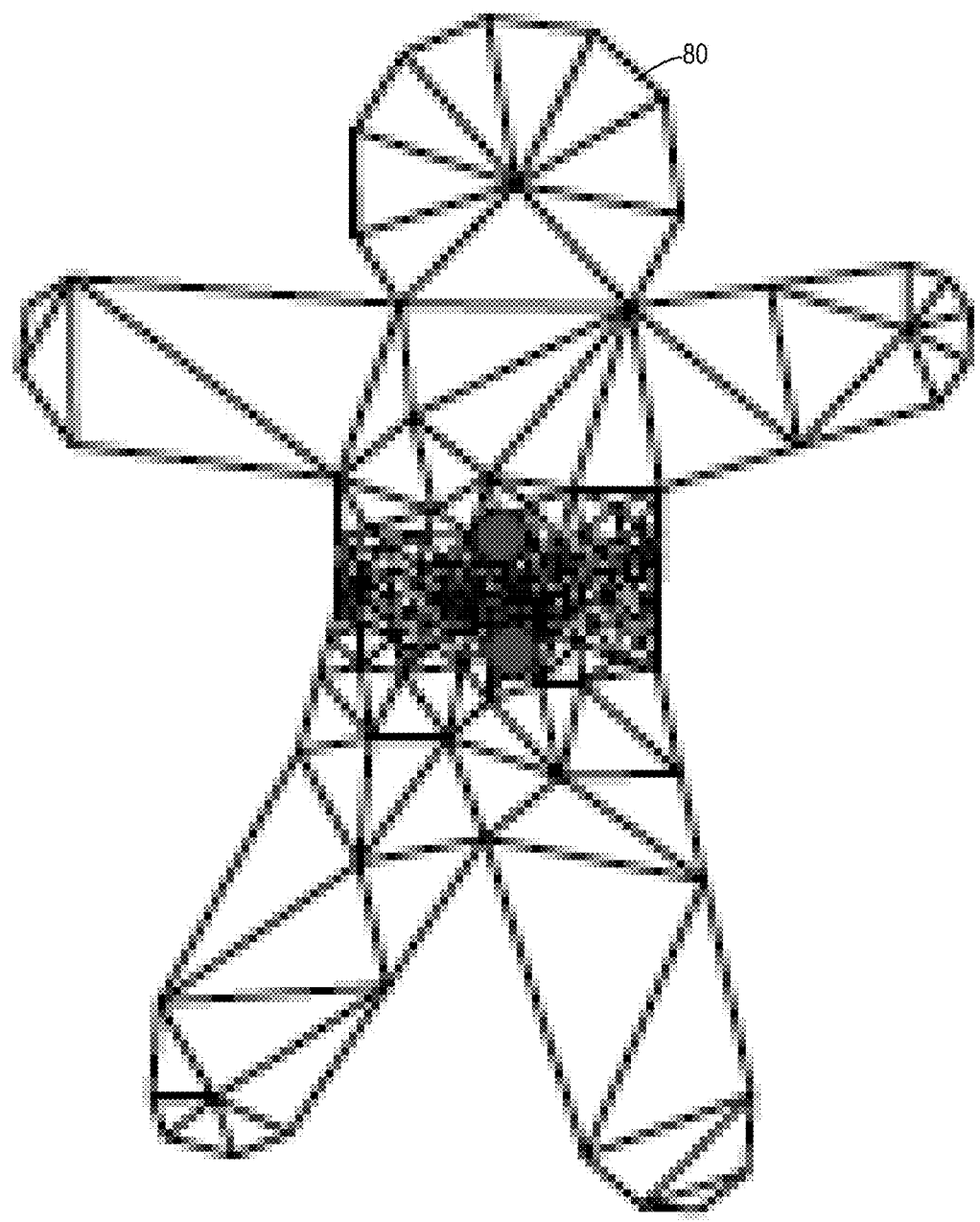
FIG. 8 provides an example adaptive mesh in which resolution of the mesh is adapted to the positions of the handles.

FIG. 8 provides an example adaptive mesh 80 in which resolution of the mesh is adapted to the positions of the handles. In this example, the adaptive mesh 80 includes relatively small triangles between the two handles where they are needed and relatively large triangles are used everywhere else, leading to a much more compact overall mesh.

Adaptive Triangulation and Handle-Weights Solver
Mesh Refinement

Figure 9:
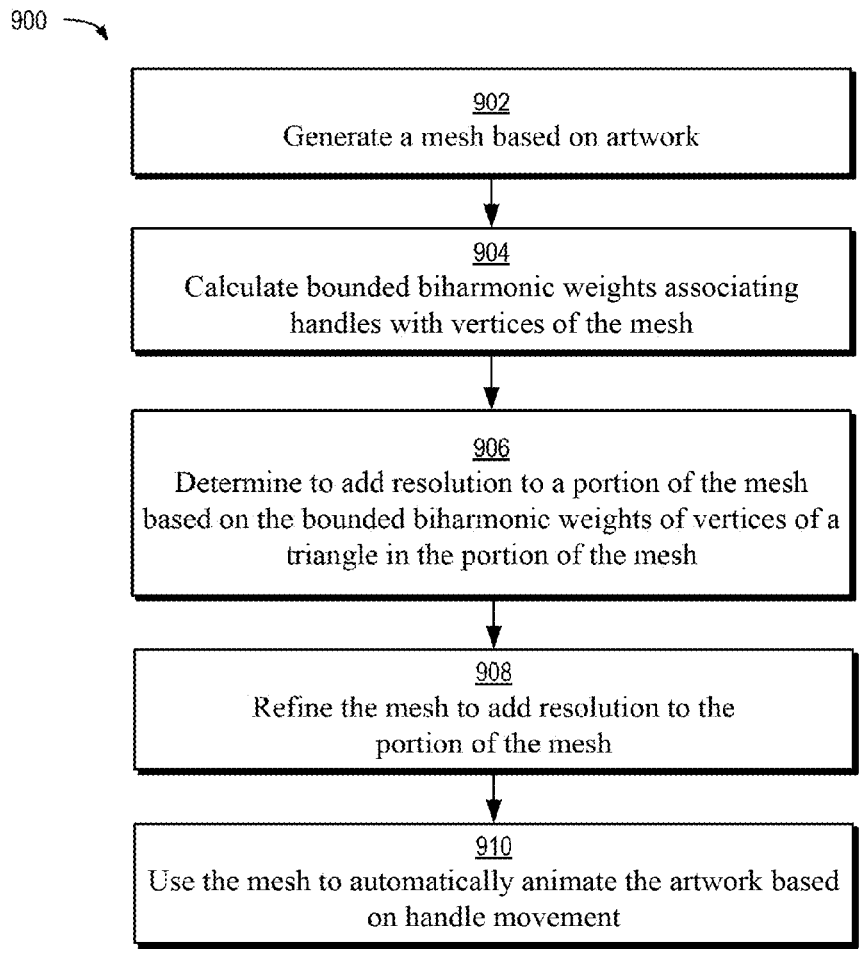
FIG. 9 is a flow chart illustrating an exemplary method for adaptive meshing.
Figures 10, 11, 12, 13:
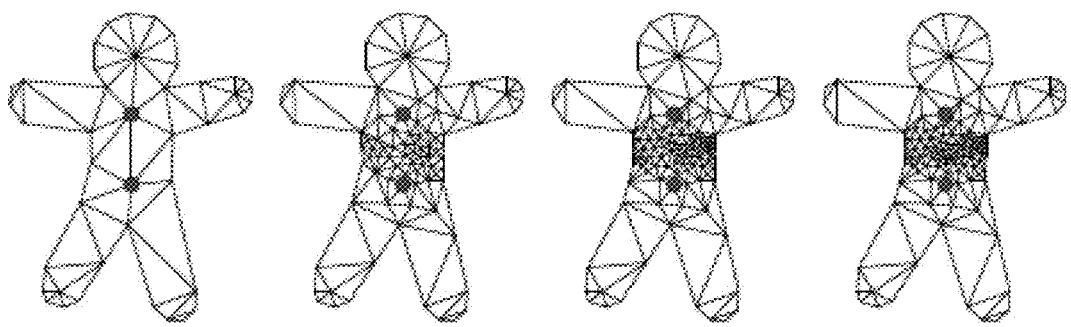
FIGS. 10-13 illustrate exemplary meshes resulting in each step of an exemplary refinement process.

FIG. 9 is a flow chart illustrating an exemplary method 900 for adaptive meshing. The elements of the method 900 are accomplished using a computing device such as, but not limited to, the computing device 1700 of FIG. 17.

Method 900 involves generating a mesh based on artwork, as shown in block 902. The mesh comprises triangles with vertices on the artwork and handles are located at some of the vertices. Method 900 further involves calculating bounded biharmonic weights, as shown in block 904. The weights represent the significance of individual handles to individual vertices of the mesh. In one embodiment, calculating the bounded biharmonic weights comprises calculating the bounded biharmonic weights for multiple handles located at vertices of the mesh, the bounded biharmonic weights representing significance of the respective handles to individual vertices of the mesh.

Method 900 further involves determining to add resolution to a portion of the mesh based on the bounded biharmonic weights of vertices of a triangle in the portion of the mesh, as shown in block 906. In one embodiment, determining to add resolution to the portion of the mesh involves determining to add resolution where additional resolution is needed to ensure a smooth deformation. In one embodiment, resolution is only added to portions of the mesh where additional resolution is needed and resolution is not added to other portions of the mesh. In one embodiment, determining to add resolution to the portion of the mesh involves determining that a maximum difference between bounded harmonic weights of any two of the vertices of the triangle exceeds a threshold.

Method 900 further involves refining the mesh to add resolution to the portion of the mesh, as shown in block 908. This involves increasing the triangles and vertices in the portion of the mesh. In one embodiment, refining the mesh involves determining a constraint and generating the mesh again using the constraint. The constraint, in one embodiment, requires that vertices of the mesh satisfy a weighting criteria. Resolution can be added to multiple portions of the mesh simultaneously or iteratively.

One embodiment involves iteratively determining to add resolution to particular portions of the mesh and regenerating the mesh until the weights of vertices in all triangles of the mesh satisfy a criteria. This can involve iteratively determining to add resolution to particular portions of the mesh and regenerating the mesh until a maximum difference of weights of any two of the vertices in all triangles of the mesh does not exceed a threshold. FIGS. 10-13 illustrate exemplary meshes resulting in each step of an exemplary refinement process. In one embodiment, the resulting mesh, such as the resulting mesh of FIG. 13, comprises relatively higher resolution in some portions than in other portions.

Method 900 further involves using the mesh to automatically animate artwork based on handle movement, as shown in block 910. In one embodiment, this involves receiving a movement of one or more handles, determining handle affine transformations based on the movement, and applying the handle affine transformations to move mesh vertices based on the biharmonic weights of the mesh. Other techniques can additionally or alternatively be used.

An example of the above described adaptive meshing technique is discussed next. This embodiment involves a technique that simultaneously solves for both the triangulation of the artwork's outline and the bounded biharmonic weights for each handle. The technique begins with an as-coarse-as-possible triangulation of the artwork's outline such that each handle is located at a unique vertex in the mesh. An algorithm is used to solve for bounded biharmonic weights for each handle on this coarse mesh. The next step is to refine this coarse mesh to add more triangles where extra resolution is needed. In this example, if the weights for each handle are constant at each of a triangle's vertices, then the triangle's ideal deformation, given the affine transformation matrices for each handle, is itself described by an affine transformation. This means that the rendering used by a standard triangle rasterization algorithm already perfectly captures such a triangle's ideal deformation. Thus there is no need to add extra resolution within a triangle where the handle weights at each vertex are identical.

In contrast, for a triangle where the handle weights at each vertex are not identical, the triangle's ideal deformation is not in general described by an affine transformation, but is instead a more complex non-rigid deformation. This indicates that extra resolution is needed within the triangle and the area within such a triangle is marked as requiring a maximum triangle area at most $$\frac{\Delta w_{max}^2}{\Delta w^2}$$

times the triangle's original area, where $\Delta w$ is the maximum difference between the weights of any handle between the triangle's three vertices, and $\Delta w_{max}$ is a pre-specified desired upper bound to $\Delta w$. For example, $\Delta w_{max}=0.2$ is used in one embodiment. Any triangle for which $\Delta w \leq \Delta w_{max}$ is treated as having handle weights which are "close enough" to constant so that extra resolution is not added within the triangle.

Once each triangle has been processed and the constraints on the desired maximum area for each triangle in the resulting mesh determined, the artwork's outline is retriangulated while respecting these constraints. The process is then repeated on this new mesh, continuing until no $\Delta w \leq \Delta w_{max}$ for every triangle in the resulting mesh. This process gradually adds more resolution in the areas where it is needed until the final mesh has enough resolution to ensure visually smooth deformations.

Iterative Approach

One embodiment involve a technique that solves for the weights from scratch. However, in another embodiment it is more efficient to use the solution of the weights for a course mesh to speed up the solution for the weights at the next finer mesh in the refinement process.

Figure 14:
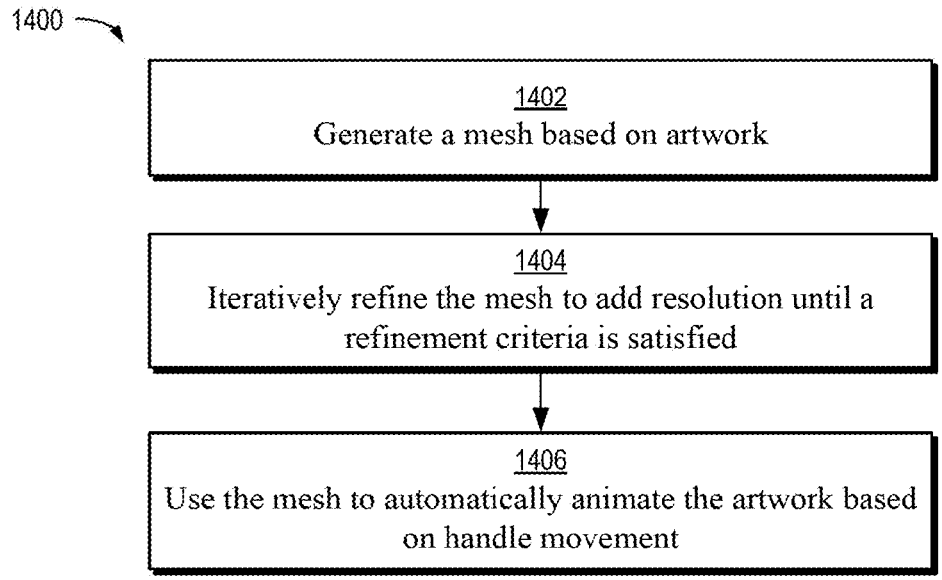
FIG. 14 is a flow chart illustrating an exemplary method for determining a mesh using a course-to-fine iterative approach.

FIG. 14 is a flow chart illustrating an exemplary technique 1400 for determining a mesh using a course-to-fine iterative approach. The elements of the technique 1400 are accomplished using a computing device such as, but not limited to, the computing device 1700 of FIG. 17.

Method 1400 involves generating the mesh based on the artwork, as shown in block 1402. The mesh comprises triangles with vertices on the artwork. Handles are located at some of the vertices.

Figure 15:
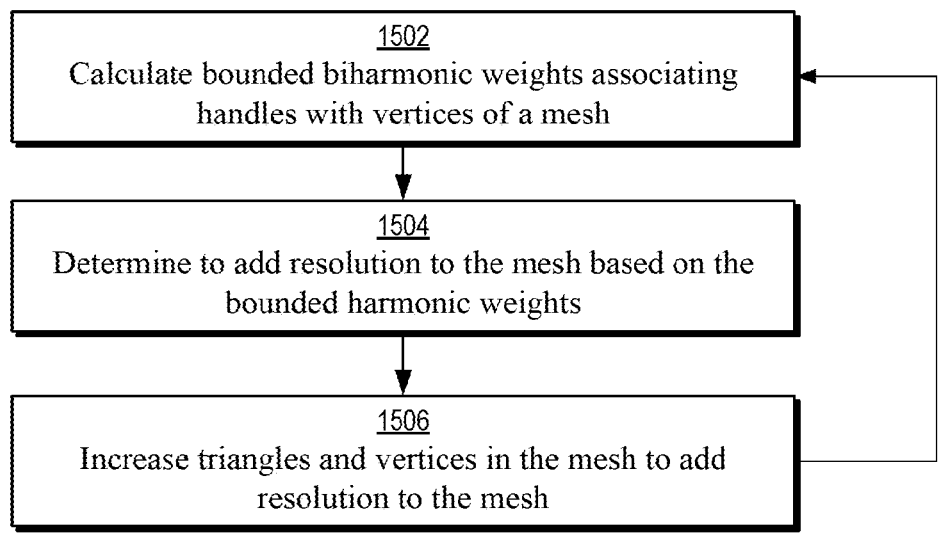
FIG. 15 is a flow chart illustrating an exemplary method for iteratively refining a mesh.

Method 1400 involves iteratively refining the mesh to add resolution until a refinement criteria is satisfied, as shown in block 1404. FIG. 15 is a flow chart illustrating an exemplary technique 1500 for iteratively refining a mesh. Method 1500 involves calculating bounded biharmonic weights for the handles, as shown in block 1502. The weights represent the significance of individual handles to individual vertices of the mesh. Method 1500 further involves determining to add resolution to the mesh based on the bounded harmonic weights, as shown in block 1504. The method 1500 further involves increasing triangles and vertices in the mesh to add resolution to the mesh, as shown in block 1506. Method 1500 then returns to block 1502 until a refinement criteria is satisfied. Refining the mesh in one embodiment only adds resolution to portions of the mesh in which more resolution is needed based on the refinement criteria, for example, to ensure a smooth deformation of the mesh. In one example, resolution is added to particular portions of the mesh and the mesh is regenerated until weights of vertices in all triangles of the mesh satisfy the refinement criteria.

Returning to FIG. 14, after iteratively refining the mesh, method 1400 involves using the mesh to automatically animate artwork based on handle movement, as shown in block 1406. In one embodiment, this involves receiving a movement of one or more handles, determining handle affine transformations based on the movement, and applying the handle affine transformations to move mesh vertices based on the biharmonic weights of the mesh. Other techniques can additionally or alternatively be used.

Multi-Scale Bounded Biharmonic Weights Solver

In one embodiment, bounded biharmonic weights associate each handle with a vector of weights, denoted w. This vector has one entry for each vertex in the mesh such that $w_i$ is a weight between 0 and 1 describing which proportion of the ith vertex's position is determined by the handle. Each handle's weight vector is solved for independently as the minimizer of a quadratic programming problem:

$$\min_w w^T M w \quad (1)$$

$$\text{s.t. } 0 \leq w \leq 1 \quad (2)$$

Additional constraints specify that $w_i=1$ at any vertices associated with the handle and that $w_i=0$ at any vertices associated with other handles. Were it not for the $0 \leq w \leq 1$ constraint this could be minimized with a single linear system solve. Instead, to handle the constraint, the technique employs a common method of using a block pivoting algorithm. This technique solves for the handle weights by solving a sequence of linear systems. At each iteration, the variables in w are partitioned into three sets, denoted U, $V^0$, and $V^1$ and the following optimization is solved:

$$\min_w w^T M w \quad (3)$$

$$\text{s.t. } w_i=0 \quad \forall i \in V^0 \quad (4)$$

$$w_i=1 \quad \forall i \in V^1 \quad (5)$$

The w minimizing this optimization problem can be found with a single linear system solve. Once this is done, the U, $V^0$, and $V^1$ sets are updated and the process is repeated until convergence, at which point the handle weights have been found.

This is a standard class of approaches for solving an inequality-constrained quadratic minimization of the sort used to solve for the handle weights. Although these methods always converge to the correct solution eventually, they may require many iterations of updating the U, $V^0$, and $V^1$ to do so. To speed up this process, the technique uses information about the handle weights solved for in a coarse mesh in the refinement process to guess at a good initialization for the U, $V^0$, and $V^1$ sets used to solve for the weights of the next finer mesh.

To do this, for each handle the technique starts with the vector of handle weights $w^{coarse}$ for the coarse mesh, and uses barycentric interpolation to create an initial guess at the handle weights for the mesh's refinement, denoted $w^{fine}$. We then set $V^0=\{i:w_i^{fine}=0\}$, $V^1=\{i:w_i^{fine}=1\}$ and $U=\{i:0<w_i^{fine}<1\}$. The technique then proceeds with the block pivoting algorithm starting with these initial guesses.

This leads to a significantly more efficient solution for the handle weights, since low frequency features of the handle weights are solved for in the coarse mesh refinements, and during each iteration of the refinement process only a few iterations of the block pivoting algorithm are needed to capture some fine-level details.

Fast 2D Deformation Solver

In prior techniques, a user specifies handle movements and the technique figures out where the rest of the artwork moves by blending weights. More specifically, the system recognizes the movement of one or more handles as translations and then figures out the rest of the parameters of an affine transformation for each of the handles. Those affine transformations are then used to determine how the rest of the mesh is to be changed. One optimization used by prior techniques to determine mesh deformations based on handle movements operates by alternating between two steps, a local step and a global step. In the local step, given potential handle transformations, the technique determines a single rotation, denoted R, for each rotation cluster (i.e. group of vertices) to minimize the difference between a the positions of the vertices in the cluster of the original mesh after applying the rotation R and the positions corresponding vertices in the deformed mesh. This first step requires solving for the optimal rigid transformation to align two point sets, and is performed once per rotation cluster per iteration of the optimization's outer loop. Each cluster's rotation, R, is solved with a singular value decomposition, a standard technique in Procrustes analysis. The global step amounts to solving a linear system for the rotational parameters in the transformation matrix for each handle while holding the rotations for each cluster fixed. The prior technique for determining handle affine transformation values (i.e., the ones that are not translation) based on handle translations can sometimes be too slow for smooth real-time deformations, particularly on mobile devices.

Figure 16:
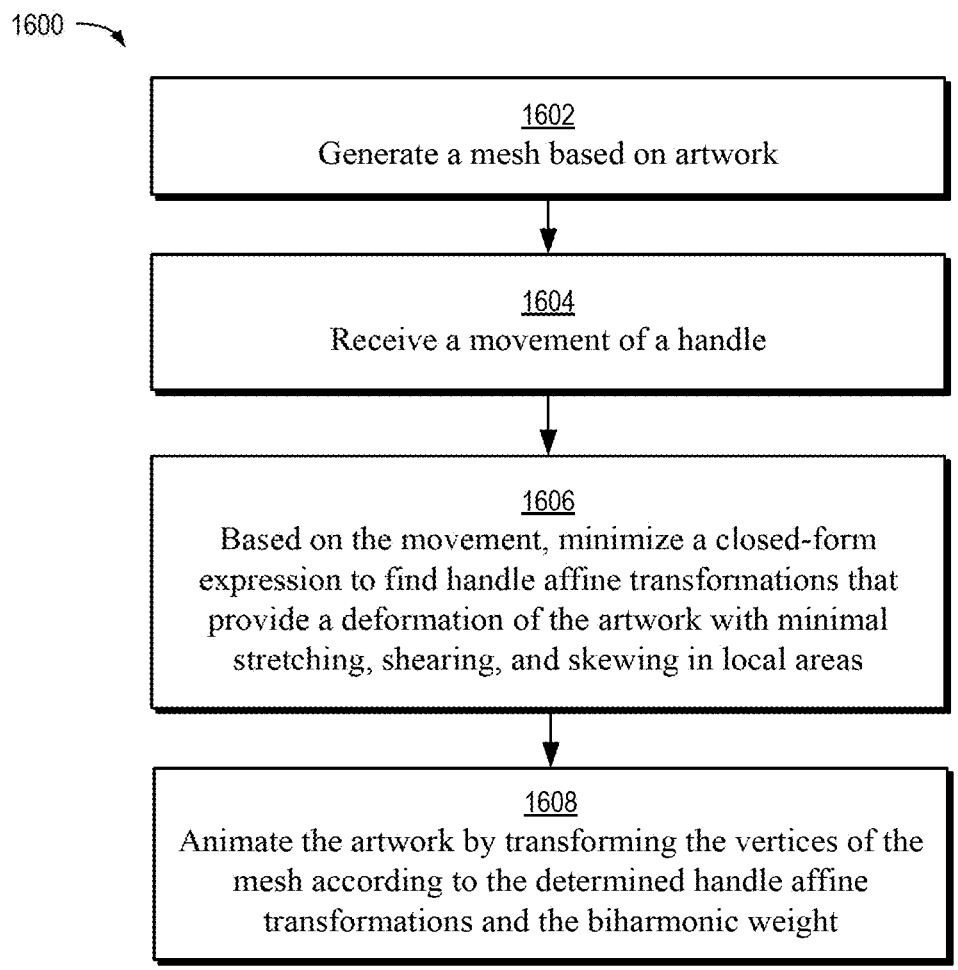
FIG. 16 is a flow chart illustrating an exemplary technique for computing deformations by determining handle affine transformations used to animate 2 Dimensional (2D) artwork in a computationally simpler manner.

FIG. 16 illustrates an exemplary method 1700 for deforming computing deformations by determining handle affine transformations used to animate 2 Dimensional (2D) artwork in a computationally simpler manner. The elements of the technique 1600 are accomplished using a computing device such as, but not limited to, the computing device 1700 of FIG. 17.

The method 1600 involves generating a mesh based on the artwork, as shown in block 1602. The mesh comprises vertices forming triangles on the artwork and bounded biharmonic weights for handles represent the significance of individual handles to individual vertices of the mesh.

The method 1600 further involves receiving a movement of a handle of the handles, as shown in block 1604. For example, a user may drag one or more handles to new positions on a graphical user interface. In another example, a user specifies coordinates for a new handle position. In another example, a computer algorithm automatically determines a new position for a handle. In one example, handle movements are automatically determined for each of a series of frames based on a user specifying an initial frame and an ending frame. For each frame, the handle movements are used to determine a deformation of the artwork in that particular frame.

The method 1600 further involves, based on the movement, minimizing a closed-form expression to find handle affine transformations that provide a deformation of the artwork with minimal stretching, shearing, and skewing in local areas, as shown in block 1606. In one embodiment, the local areas are represented as rotation clusters comprising groupings of vertices. In one case, rotation clusters are identified to represent local areas by subdividing vertices of the mesh based on similarity of the bounded biharmonic weights of the vertices. Based on the identified rotation clusters, minimizing the closed-form expression involves minimizing an energy function to minimize differences between one set of points representing a rotation cluster transformed according to a deformation of the mesh and another set of points representing a simple rotation of the rotation cluster with no stretching, shearing, or skewing. This can involve minimizing an energy function to optimally rotate rotation clusters while minimizing differences between the sets of points. The energy function can represent the desirability of deformations of the rotation clusters in a closed-form algebraic equation for the optimal rotation aligning the sets of points.

In one embodiment, the closed-form expression of block 1706 is minimized without evaluating any conditional branches. In one embodiment, the closed-form expression represents the desirability of the deformations using only a convex function and a concave function. In one embodiment, the closed-form expression represents the desirability of the deformations using a difference between a quadratic form and a sum of cones.

The method 1600 further involves animating the artwork by transforming the vertices of the mesh according to the determined handle affine transformations and the biharmonic weights, as shown in block 1608.

The following description provides an example of a more efficient solver for the optimization problem that slowed prior deformation techniques. This example is specific to 2D deformations, which is the most common case for many applications. This example technique is based on the observation for solving 2D orthogonal Procrustes problems that given two vectors of 2D points given by $(x_1,y_1), \ldots, (x_n,y_n)$ and $(u_1,v_1), \ldots, (u_n,v_n)$, the angle $\Theta$ of the optimal rotation best aligning each $(u_j,v_j)$ with its associated $(x_j,y_j)$ can be computed in closed form as:

$$\Theta = \arctan\left(\frac{\sum_j (y_j u_j - x_j v_j)}{\sum_j (x_j u_j + y_j v_j)}\right) \quad (6)$$

The improved optimization technique is based on recognizing that it is convenient to represent each of the 2D points to be aligned as a complex number. Accordingly, let $p_j$ and $q_j$ be complex numbers with $p_j = x_j + i y_j$, $q_j = u_j + i v_j$. Also let p and q be the (complex) vectors of these points. By representing the points this way, a rotation can be represented as a unit complex number r. The optimal rotation aligning p to q minimizes $|q-rp|_2$ and can be computed with:

$$\frac{p^* q}{|p^* q|} \quad (7)$$

Where p* is the conjugate transpose of p. This is equivalent to the method for calculating $\Theta$ described above, but expressed in a more mathematically convenient form.

The advantage of having a mathematically convenient closed-form solution to the 2D orthogonal Procrustes problem like this is that it allows the creation of a more efficient solver by algebraically combining some parts of the rotation fitting used in the local step into the global step. To derive how this is achieved, let the position of each vertex in the original mesh for the artwork be denoted by a complex-valued vector p, and the positions in the deformed mesh by q. The deformation of the artwork is solved for by minimizing an energy function. In the 2D formulation using complex numbers instead of real numbers, this energy function can be written as:

$$\sum_{k=1}^{g} |F_k q - r_k F_k p|_2^2 \quad (8)$$

Where k indexes over the rotation clusters, $r_k$ is a complex number representing the rotation of each cluster, and $F_k$ is a real-valued matrix extracting the features describing how a rotation cluster should be aligned. $F_k$ is determined by the edge sets of each rotation cluster, and can be defined as $F_k=\sqrt{C_k A_k}$. Use of this equation is further described by Alec Jacobson, Ilya Baran, Ladislav Kavan, Jovan Popovic, and Olga Sorkine, "Fast automatic skinning transformations," ACM Transactions on Graphics (proceedings of ACM SIGGRAPH), 31(4):77:1-77:10, 2012, the disclosure of which is incorporated herein in its entirety by this reference. Additional or alternative techniques may be used.

To determine the unknown parameters for affine transformations for each handle, the technique attempts to figure out how potential transformations impact rotation clusters. With this in mind, the deformed mesh is expressed as a linear function of an affine transform matrix associated with each handle. This relationship is expressed as q=Mt where t is a real-valued vector and M is a complex-valued matrix. This means that the optimization problem to be solved in order to determine q can be solved as:

$$\min_{q, r_1, \ldots, r_g} \sum_{k=1}^{g} |F_k q - r_k F_k p|_2^2 = \quad (9)$$

$$\min_q \sum_{k=1}^{g} \left| F_k q - \frac{p^* F_k^* F_k q}{|p^* F_k^* F_k q|} F_k p \right|_2^2 = \quad (10)$$

$$\min_t \sum_{k=1}^{g} \left| F_k M t - \frac{p^* F_k^* F_k M t}{|p^* F_k^* F_k M t|} F_k p \right|_2^2 \quad (11)$$

Since $F_k$ and p and M are known prior to solving for the deformation, we can precompute $m_k^* = p^* F_k^* F_k M$ and $L_k = M^* F_k^* F_k M$ and write this as:

$$\min_t \sum_{k=1}^{g} \left| F_k M t - \frac{m_k^* t}{|m_k^* t|} F_k p \right|_2^2 = \quad (12)$$

$$\min_t \sum_{k=1}^{g} \left( t^T M^* F_k^* F_k M t - 2 \Re \left( \frac{t^T m_k}{|t^T m_k|} p^* F_k^* F_k M t \right) + C \right) = \quad (13)$$

$$\min_t \sum_{k=1}^{g} \left( t^T L_k t - 2 \Re \left( \frac{t^T m_k}{|t^T m_k|} m_k^* t \right) + C \right) = \quad (14)$$

$$\min_t \sum_{k=1}^{g} \left( t^T L_k t - 2 \frac{t^T m_k m_k^* t}{\sqrt{t^T m_k m_k^* t}} + C \right) = \quad (15)$$

$$\min_t \sum_{k=1}^{g} (t^T L_k t - 2|m_k^* t| + C) \quad (16)$$

Where C is a constant, and thus does not affect the optimal value of t minimizing the energy function. Further defining $$L = \sum_{k=1}^{g} L_k$$

lets this be simplified to:

$$\min_t \ t^T L t - 2 \sum_{k=1}^{g} |m_k^* t| \quad (17)$$

This formulation is more efficient than prior techniques since both the objective function and its gradient can be quickly evaluated with only additions, multiplications and square roots without any need for conditional branches. Furthermore, the particularly simple form of the objective function allows it to be efficiently solved with a very simple optimization method. Note that the objective function $t^T Lt - 2\sum_{k=1}^{g} |m_k^* t|$ is the sum of two terms. The first is $t^T Lt$, which is a positive-definite quadratic function of t, and is thus convex. The second is $-2\sum_{k=1}^{g} |m_k^* t|$, which is the negative of a sum of quadratic cones. Since a quadratic cone is convex, this second term is concave. This means that the objective function can be conveniently expressed as the sum of a convex function and a concave function. The convex-concave procedure (CCCP) solves optimization problems expressed as the sum of a convex function and a concave function. Applying the convex-concave procedure to solve for artwork deformation can simplify the computations further. In one example, the technique starts with an initial guess $t_0$ and repeats the following update until convergence:

$$t_{n+1} = L^{-1} \sum_{k=1}^{g} m_k \frac{m_k^* t}{|m_k^* t|} \quad (18)$$

An example convave-convex procedure is disclosed in A. L. Yuille and Anand Rangarajan, "The concave-convex procedure," Neural Comput., 15(4):915-936, April 2003, which is incorporated herein in its entirety by this reference. Additional or alternative techniques can be used.

The technique precomputes and stores the Cholesky factorization of L so that the linear system can be solved at each iteration without needing a costly factorization step. Variations of the techniques presented herein are of course possible.

The improved deformation solver technique presented herein does not require use of a singular value decomposition and does not require iterating between a local step and a global step. It is thus more efficient to compute than prior techniques.

Exemplary Computing Environment

Figure 17:
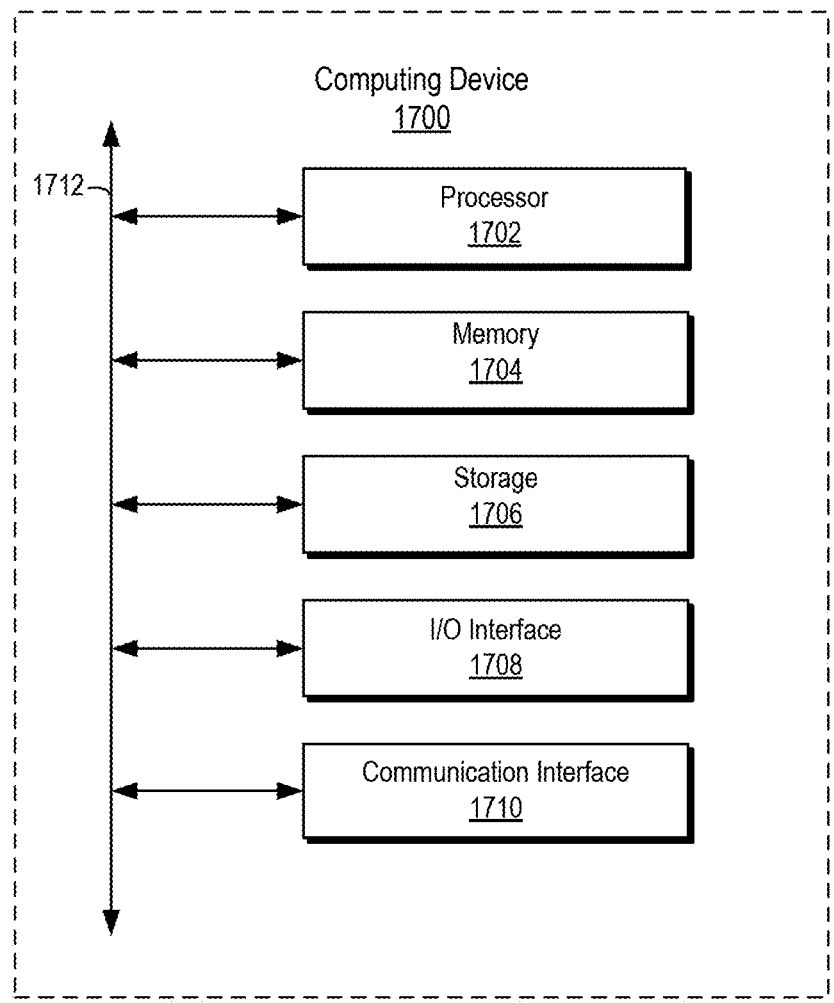
FIG. 17 is a block diagram depicting an example hardware implementation.

Any suitable computing system or group of computing systems can be used to implement the techniques and methods disclosed herein. For example, FIG. 17 is a block diagram depicting examples of implementations of such components. The computing device 1700 can include a processor 1702 that is communicatively coupled to a memory 1704 and that executes computer-executable program code and/or accesses information stored in memory 1704 or storage 1706. The processor 1702 may comprise a microprocessor, an application-specific integrated circuit ("ASIC"), a state machine, or other processing device. The processor 1702 can include one processing device or more than one processing device. Such a processor can include or may be in communication with a computer-readable medium storing instructions that, when executed by the processor 1702, cause the processor to perform the operations described herein.

The memory 1704 and storage 1706 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 150 may also comprise a number of external or internal devices such as input or output devices. For example, the computing device is shown with an input/output ("I/O") interface 1708 that can receive input from input devices or provide output to output devices. A communication interface 1710 may also be included in the computing device 150 and can include any device or group of devices suitable for establishing a wired or wireless data connection to one or more data networks. Non-limiting examples of the communication interface 1710 include an Ethernet network adapter, a modem, and/or the like. The computing device 1700 can transmit messages as electronic or optical signals via the communication interface 1710. A bus 1712 can also be included to communicatively couple one or more components of the computing device 1700.

The computing device 1700 can execute program code that configures the processor 1702 to perform one or more of the operations described above. The program code can include one or more modules. The program code may be resident in the memory 1704, storage 1706, or any suitable computer-readable medium and may be executed by the processor 1702 or any other suitable processor. In some embodiments, modules can be resident in the memory 1704. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for animating artwork based on handle movement on the artwork, the method comprising:

generating, by a processor of a computing device, a mesh based on the artwork, wherein the mesh comprises triangles with vertices on the artwork, wherein bounded biharmonic weights for handles represent significance of individual handles to individual vertices of the mesh;

receiving, by the processor of the computing device, a movement of a handle of the handles;

based on the movement, minimizing, by the processor of the computing device, a closed-form expression to find handle affine transformations that provide a deformation of the artwork with minimal stretching, shearing, and skewing in local areas; and animating, by the processor of the computing device, the artwork by transforming the vertices of the mesh according to the determined handle affine transformations and the bounded biharmonic weights, wherein the local areas are represented as rotation clusters comprising groupings of vertices, and wherein minimizing the closed-form expression comprises minimizing an energy function to minimize differences between one set of points representing a rotation cluster transformed according to a deformation of the mesh and another set of points representing a simple rotation of the rotation cluster with no stretching, shearing, or skewing.

2. The method of claim 1, wherein minimizing the closed-form expression comprises minimizing an energy function to optimally rotate the rotation clusters while minimize differences between one set of points representing a second rotation cluster transformed according to a deformation of the mesh and another set of points representing a simple rotation of the second rotation cluster with no stretching, shearing, or skewing.

3. The method of claim 1 further comprising identifying the rotation clusters to represent the local areas by subdividing vertices of the mesh based on similarity of the bounded biharmonic weights of the vertices.

4. The method of claim 1 further comprising:
identifying the rotation clusters to represent the local areas by subdividing vertices of the mesh based on similarity of the bounded biharmonic weights of the vertices; and
minimizing an energy function that represents desirability of deformations of the rotation clusters in a closed-form algebraic equation for an optimal rotation aligning a sets of points representing a second rotation cluster transformed according to a deformation of the mesh and another set of points represents a simple rotation of the second rotation cluster with no stretching, shearing, or skewing.

5. The method of claim 1, wherein the closed-form expression is minimized without evaluating any conditional branches.

6. The method of claim 1, wherein the closed-form expression represents the desirability of the deformations using only a convex function and a concave function.

7. The method of claim 1, wherein the closed-form expression represents the desirability of the deformations using a difference between a quadratic form and a sum of cones.

8. A system comprising:
a processor for executing instructions stored in a non-transitory computer-readable medium on one or more devices,
the non-transitory computer-readable medium comprising instructions, wherein when executed by the processor, the instructions perform steps comprising:
generating a mesh based on the artwork, wherein the mesh comprises triangles with vertices on the artwork, wherein bounded biharmonic weights for handles represent significance of individual handles to individual vertices of the mesh;
receiving a movement of a handle of the handles;
based on the movement, minimizing a closed-form expression to find handle affine transformations that provide a deformation of the artwork with minimal stretching, shearing, and skewing in local areas; and
animating the artwork by transforming the vertices of the mesh according to the determined handle affine transformations and the bounded biharmonic weights, wherein the local areas are represented as rotation clusters comprising groupings of vertices, and wherein minimizing the closed-form expression comprises minimizing an energy function to minimize differences between one set of points representing a rotation cluster transformed according to a deformation of the mesh and another set of points representing a simple rotation of the rotation cluster with no stretching, shearing, or skewing.

9. The system of claim 8, wherein minimizing the closed-form expression comprises minimizing an energy function to optimally rotate the rotation clusters while minimize differences between one set of points representing a second rotation cluster transformed according to a deformation of the mesh and another set of points representing a simple rotation of the second rotation cluster with no stretching, shearing, or skewing.

10. The system of claim 8, further comprising identifying the rotation clusters to represent the local areas by subdividing vertices of the mesh based on similarity of the bounded biharmonic weights of the vertices.

11. The system of claim 8, wherein the operations further comprise:
identifying the rotation clusters to represent the local areas by subdividing vertices of the mesh based on similarity of the bounded biharmonic weights of the vertices; and
minimizing an energy function that represents desirability of deformations of the rotation clusters in a closed-form algebraic equation for an optimal rotation aligning a sets of points representing a second rotation cluster transformed according to a deformation of the mesh and another set of points represents a simple rotation of the second rotation cluster with no stretching, shearing, or skewing.

12. The system of claim 8, wherein the closed-form expression is minimized without evaluating any conditional branches.

13. The non-transitory computer readable medium of claim 8, wherein the local areas are represented as rotation clusters comprising groupings of vertices, and wherein minimizing the closed-form expression comprises minimizing an energy function to minimize differences between one set of points representing a rotation cluster transformed according to a deformation of the mesh and another set of points representing a simple rotation of the rotation cluster with no stretching, shearing, or skewing.

14. The system of claim 8, wherein the closed-form expression represents the desirability of the deformations using a difference between a quadratic form and a sum of cones.

15. A non-transitory computer readable medium comprising instructions for performing operations, the operations comprising:
generating a mesh based on the artwork, wherein the mesh comprises triangles with vertices on the artwork, wherein bounded biharmonic weights for handles represent significance of individual handles to individual vertices of the mesh;
receiving a movement of a handle of the handles;
based on the movement, minimizing a closed-form expression to find handle affine transformations that provide a deformation of the artwork with minimal stretching, shearing, and skewing in local areas; and
animating the artwork by transforming the vertices of the mesh according to the determined handle affine transformations and the bounded biharmonic weights, wherein the local areas are represented as rotation clusters comprising groupings of vertices, and wherein minimizing the closed-form expression comprises minimizing an energy function to minimize differences between one set of points representing a rotation cluster transformed according to a deformation of the mesh and another set of points representing a simple rotation of the rotation cluster with no stretching, shearing, or skewing.

16. The non-transitory computer readable medium of claim 15, wherein minimizing the closed-form expression comprises minimizing an energy function to optimally rotate the rotation clusters while minimize differences between one set of points representing a second rotation cluster transformed according to a deformation of the mesh and another set of points representing a simple rotation of the second rotation cluster with no stretching, shearing, or skewing.

17. The non-transitory computer readable medium of claim 15, further comprising identifying the rotation clusters to represent the local areas by subdividing vertices of the mesh based on similarity of the bounded biharmonic weights of the vertices.

* * * * *